United States Patent [19]
Emery et al.

[11] Patent Number: 5,608,277
[45] Date of Patent: Mar. 4, 1997

[54] ROTARY PULSE GENERATOR HAVING PRESET SENSOR GAP

[75] Inventors: John W. Emery, North Royalton; Robert J. Hetzel, deceased, late of Maple Heights, both of Ohio, by Dorothy A. Hetzel, legal representative

[73] Assignee: Avtron Manufacturing, Inc., Independence, Ohio

[21] Appl. No.: 361,966

[22] Filed: Dec. 22, 1994

[51] Int. Cl.⁶ .................................. H02K 5/04; G01P 3/42
[52] U.S. Cl. .......................................... 310/68 B; 324/160
[58] Field of Search ........................ 310/68 B; 324/167, 324/177, 179, 160

[56] References Cited

U.S. PATENT DOCUMENTS

| | | | |
|---|---|---|---|
| 3,793,545 | 2/1974 | Leiber et al. | 310/168 |
| 4,288,746 | 9/1981 | Singbartl | 324/174 |
| 4,890,059 | 12/1989 | Guentner | 310/68 B |
| 4,901,562 | 2/1990 | Beakas et al. | 73/118.1 |
| 5,081,756 | 1/1992 | Abe et al. | 29/593 |
| 5,293,125 | 3/1994 | Griffen et al. | 324/173 |
| 5,495,758 | 3/1996 | Griffen et al. | 73/493 |

*Primary Examiner*—Thomas M. Dougherty
*Attorney, Agent, or Firm*—Tarolli, Sundheim, Covell, Tummino & Szabo

[57] ABSTRACT

A rotary pulse generator is disclosed for attachment to a rotary machine, such as a motor, having a rotary shaft extending therefrom. The generator includes a rotor which is secured to the shaft for rotation therewith. The rotor has a circumferential surface carrying an annular periodic pulse generating pattern, such as a magnetic pattern. A stator housing is secured to the machine. The stator housing carries a stator assembly including a sensor which is spaced radially from the rotor by a sensor gap. The sensor senses the pulse generating pattern and serves to provide pulses or the like having a frequency related to the angular velocity of the rotor. The sensor assembly includes a support block and a sensor support mounted to the support block for movement relative thereto between a retracted position located away from the rotor and a contact position wherein the sensor block contacts the rotor. A first means serves to drive the sensor block from the retracted position until the sensor block engages the rotor in the contact position. A second means drives the sensor block in a second direction away from the contact position toward the retracted position by a predetermined amount that defines the sensor gap.

15 Claims, 6 Drawing Sheets

ROTARY PULSE GENERATOR HAVING PRESET SENSOR GAP

TECHNICAL FIELD

This invention relates to the art of rotary pulse generators and, more particularly, to improvements for presetting a sensor gap associated therewith.

BACKGROUND OF THE INVENTION

Rotary pulse generators are known in the art and frequently are mounted to a machine having a rotary shaft. The generator provides an output pulsating signal that varies with the angular velocity of the rotary shaft. The machine frequently takes the form of a motor, although it may take other forms such as a generator or other machine that has a rotating shaft, the speed of which is to be measured. In a motor application, the shaft frequently extends through the motor and protrudes at opposite ends known as the drive end and the anti-drive or accessory end. The pulse generator includes a rotor which is mounted on the accessory end of the motor shaft. The rotor carries on its circumference a pulse generating periodic structure which may include magnetization or an optical pattern. A stator housing is mounted to the motor. The stator housing incorporates a sensor which is spaced radially from the rotor by an air gap, known as the sensor gap. This sensor gap has an optimal distance for proper operation of the sensor for producing output pulses having a frequency corresponding with the angular velocity of the shaft. The sensor gap should be maintained within a close tolerance. The sensor typically includes a wheatstone bridge incorporating resistor elements mounted in a bridge arrangement. The output of such a bridge arrangement is typically a sinusoidal signal which is then converted by suitable electronics into a train of square wave pulses for transmission to counters and controllers and the like. Preferably, the ideal square wave has a 50% duty cycle. The duty cycle is defined as the percentage of time the output signal is high or "ON" relative to the time for one complete cycle of the sinusoidal signal. If the sensor gap is too big, there will be variations in the amplitude of the sinusoidal signal detected, resulting in degradation in the desired duty cycle from 50% or total loss of detecting some or all pulses. On the other hand, if the gap is too small, it could also result in variations in the amplitude of the sinusoidal signal with the same consequences or mechanical interference between the rotor and the stator causing severe damage.

Due to the various manufacturing tolerances involved in producing the rotor and the stator, as well as, similar variations in the manufacture of the motor, variations in the sensor gap may take place from one pulse generator installation to another. This will result in variations in the accuracy of the output signals between various pulse generator installations. In order to adjust the sensor gap of a pulse generator, it has frequently been necessary to remove the pulse generator from the motor. In other situations, at least a cover plate on the stator housing is removed in order to insert a gauge or the like to measure the sensor gap and then introduce special tools for adjusting the sensor gap. Frequently, these adjustments are done by a trial and error technique.

The U.S. Patent to H. Guentner U.S. Pat. No. 4,890,059 presents an example of a digital pulse generator having an adjustable sensor gap. In Guentner, a rotor is mounted to a motor shaft. The rotor carries a magnetic pulse generating pattern on its circumferential surface. A sensor is mounted radially away from the rotor and is spaced therefrom by a sensor gap. A stator housing surrounds and encompasses the rotor and the sensor. The sensor is mounted to the stator housing so as to be adjustable relative thereto for adjusting the size of the sensor gap. A hole is provided in the housing so that a gauge taking the form of a yoke may be inserted into the interior of the housing and then into the sensor gap for adjustment of same. The sensor may be displaced relative to the housing to adjust the sensor gap.

SUMMARY OF THE INVENTION

It is an object of the present invention to provide a rotary pulse generator having a sensor gap that may be preset and which does not require removal of the stator housing or the insertion of special tools, such as gauges or the like, into the interior of the housing for adjusting the sensor gap.

The rotary pulse generator of the present invention is intended to be attached to a machine housing, such as motor housing, having a rotary shaft extending therefrom. The pulse generator includes a rotor to be secured to the shaft for rotation therewith. The rotor has a circumferential surface which carries an annular periodic pulse generating pattern, such as magnetic pulse producing pattern. A stator housing is provided and is secured to the machine so as to encompass the rotor. A sensor assembly, including a sensor, is carried by the stator housing with the sensor being spaced radially from the rotor by a sensor gap. The sensor serves to sense the pattern and provide pulses having a frequency related to the angular velocity of the rotor. The assembly includes a support block and a sensor support mounted to the support block for movement relative thereto between a retracted position located radially away from the rotor and a contact position wherein the sensor block contacts the rotor. A first means, such as extension spring, serves to drive the sensor block from its normal retracted position until the sensor block makes contact with the rotor in the contact position. A second means, such as a gaping spring, serves to drive the sensor block in a second direction opposite from the first direction away from the contact position toward the retracted position by a predetermined amount corresponding with the desired or preset sensor gap.

BRIEF DESCRIPTION OF THE DRAWINGS

The foregoing and other objects and advantages of the present invention will become more readily apparent from the following description as taken in conjunction with the accompanying drawings, wherein.

DESCRIPTION OF A PREFERRED EMBODIMENT

Figure 1:
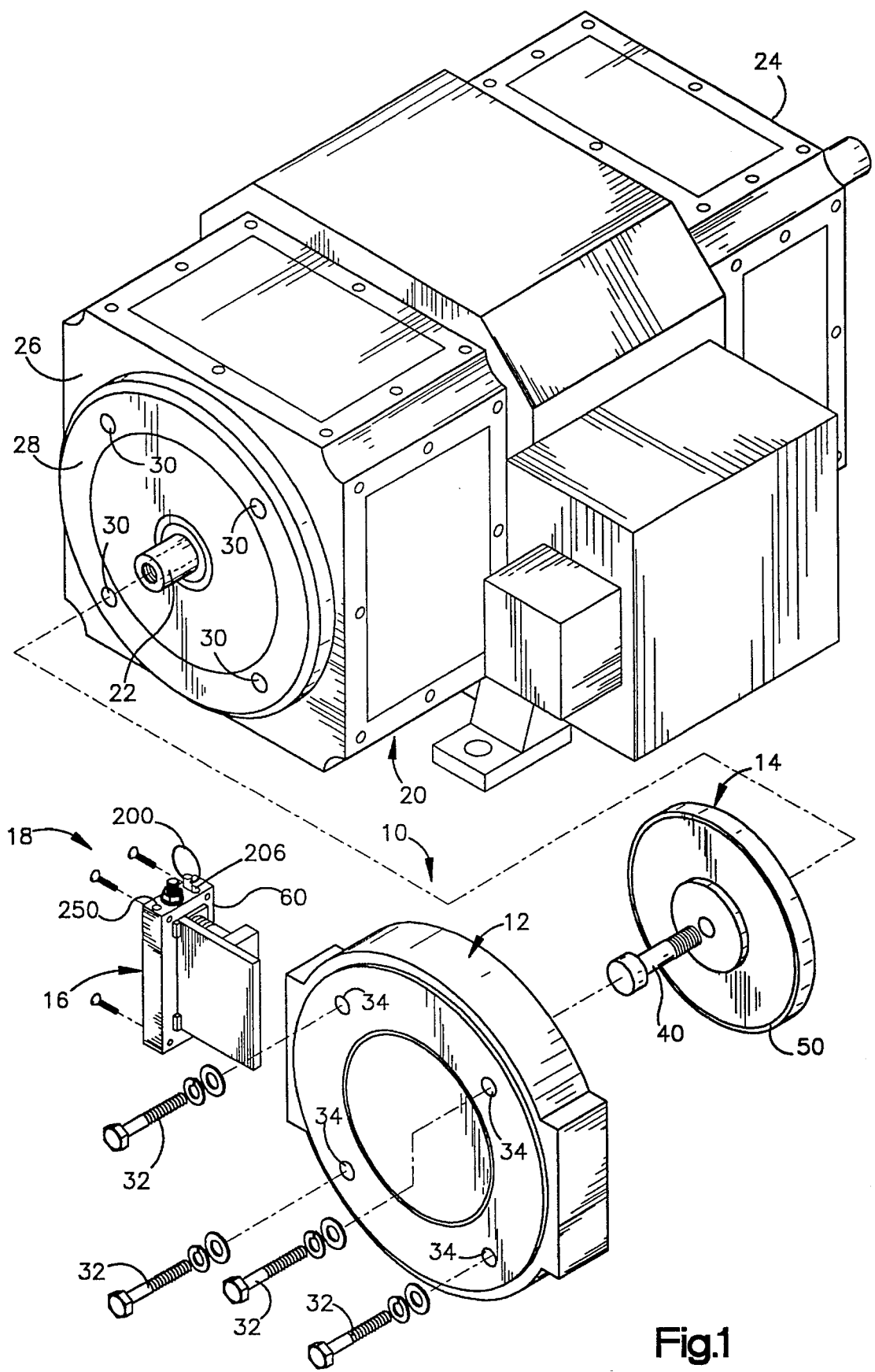
FIG. 1 is a exploded view of the improved rotary pulse generator together with a rotary machine, in the form of a motor.
Figure 2:
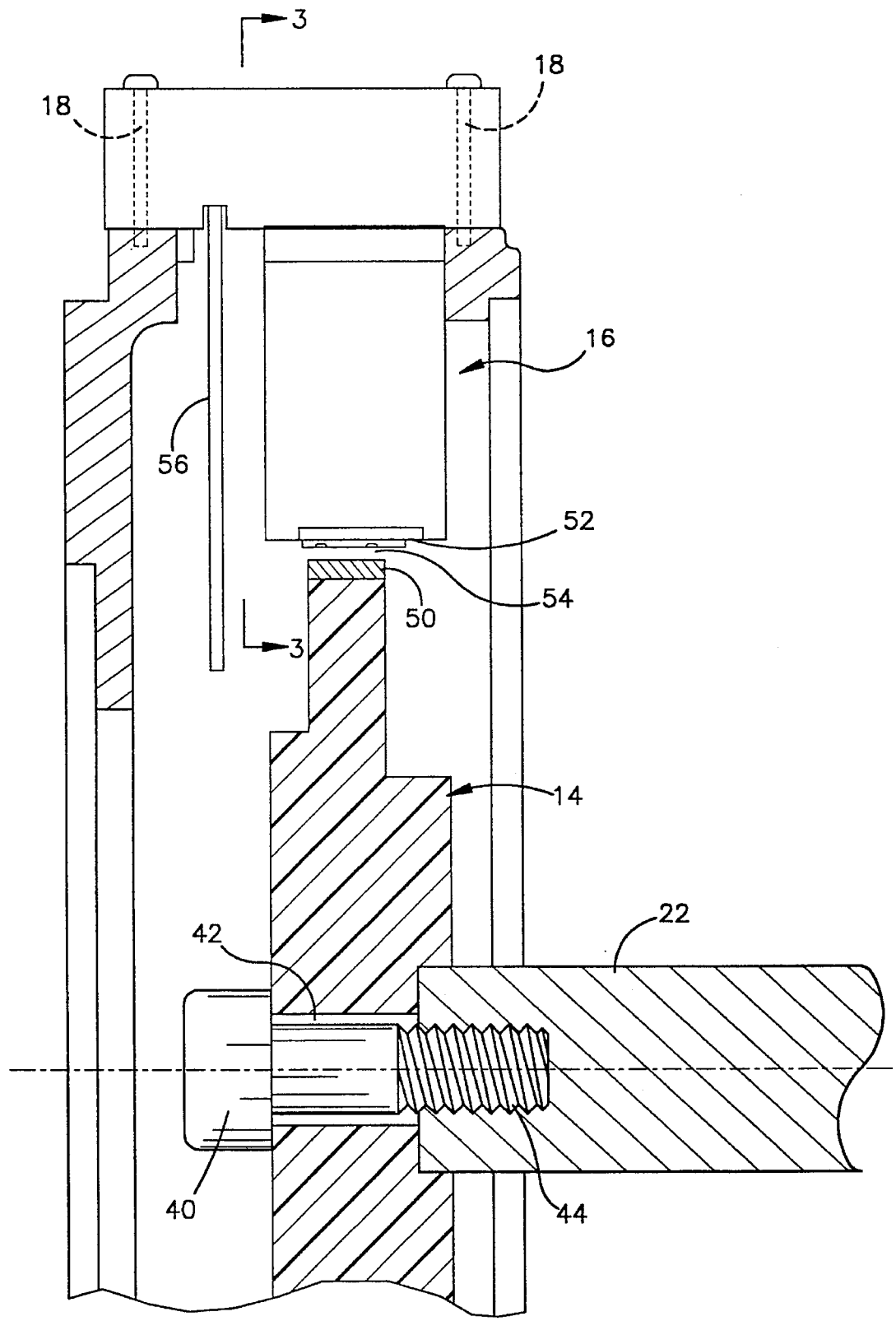
FIG. 2 is a sectional view illustrating the pulse generator of FIG. 1 mounted on a motor shaft.

Reference is now made to the drawings wherein the showings are for purposes of illustrating a preferred embodiment of the invention only and not for purposes of limiting same. Reference is specifically made to FIGS. 1 and 2 wherein a rotary pulse generator 10, in accordance with this embodiment of the invention, includes a stator housing 12, a rotor 14, and a sensor assembly 16. Assembly 16 is removably mounted to housing 12 by suitable screws 18.

The rotary pulse generator 10 is intended to be mounted on a rotary machine, such as a motor or generator or the like, having a rotary shaft, the angular velocity of which is to be monitored. A motor 20 is illustrated in FIG. 1 having a shaft 22 extending therethrough and protruding from opposite ends including a drive end 24 and an accessory or anti-drive end 26. As is typical in the art, accessories such as rotary pulse generators are mounted on the accessory or anti-drive end 26 of the motor. The motor housing is provided, at the accessory end 26, with an annular mounting face 28. This face has four spaced apart threaded apertures 30 for threadably receiving four bolts 32 which extend through suitable apertures 34 in the stator housing 12.

The rotor 14 is secured to the motor prior to attaching the stator housing 12. The rotor 14, as shown in FIG. 2, may be secured on the end of shaft 22 by means of a suitable bolt 40 which extends through a central aperture 42 in the rotor and into a threaded aperture 44 in the end of shaft 22. It is to be noted that the outer circumference of the rotor is of a diameter less than that of the annular array defined by the bolts 32.

The rotor 40 carries on its circumferential surface an annular ring 50 of magnetic material. Alternatively, the ring 14 may include an optical pattern for use in measuring the speed of rotation of the shaft. As illustrated, the ring 50 takes the form of an annular array of north and south poles made up of an array of patches which are alternately magnetized or polarized in opposing directions to provide an annular array of alternately north and south poles. Consequently, rotor 14 has a circumferential surface carrying an annular ring 50 and which may be considered as an annular periodic pulse generating pattern.

The sensor assembly 16 carries a sensor 52 which is positioned proximate to the rotor 14 and spaced from the annular ring 50 by a sensor gap 54. The sensor 52 may take various forms dictated by whether a magnetic or optical pattern is provided on the rotor 14. In the example being presented, the annular ring 50 provides a magnetic pattern and, consequently, the sensor 52 responds thereto with a frequency that is proportional to the rate of rotation of the input shaft. It is contemplated that the sensor 52 include a bridge circuit including resistance sensing elements mounted in a bridge arrangement and connected to suitable electronics which may be carried by a printed circuit 56 also carried by the sensor assembly 16. The electronics may include an operational amplifier and signal conditioning circuitry so as to produce an output taking the form of a sinusoidal signal which is then conditioned to provide a train of square wave pulses for transmission to counters and controllers and the like. The square wave pulses preferably a frequency proportional to the rate of rotation of the input shaft 10 and exhibit a 50% duty cycle. The integrity of the duty cycle will be impaired if the gap 54 departs from its optimal distance. In the example being presented, the optimal distance of gap 54 is on the order of 0.014 inch. If the gap is too small or too large, a variation from the preferred 50% duty cycle will take place.

The present invention is directed toward presetting gap 54 to a desired setting, such as a gap distance of 0.014 inch, without requiring that the pulse generator be disassembled from the motor or that the stator housing 12 be removed, or that special tools, such as gauges and the like, be inserted into the interior of the stator housing.

Figure 3:
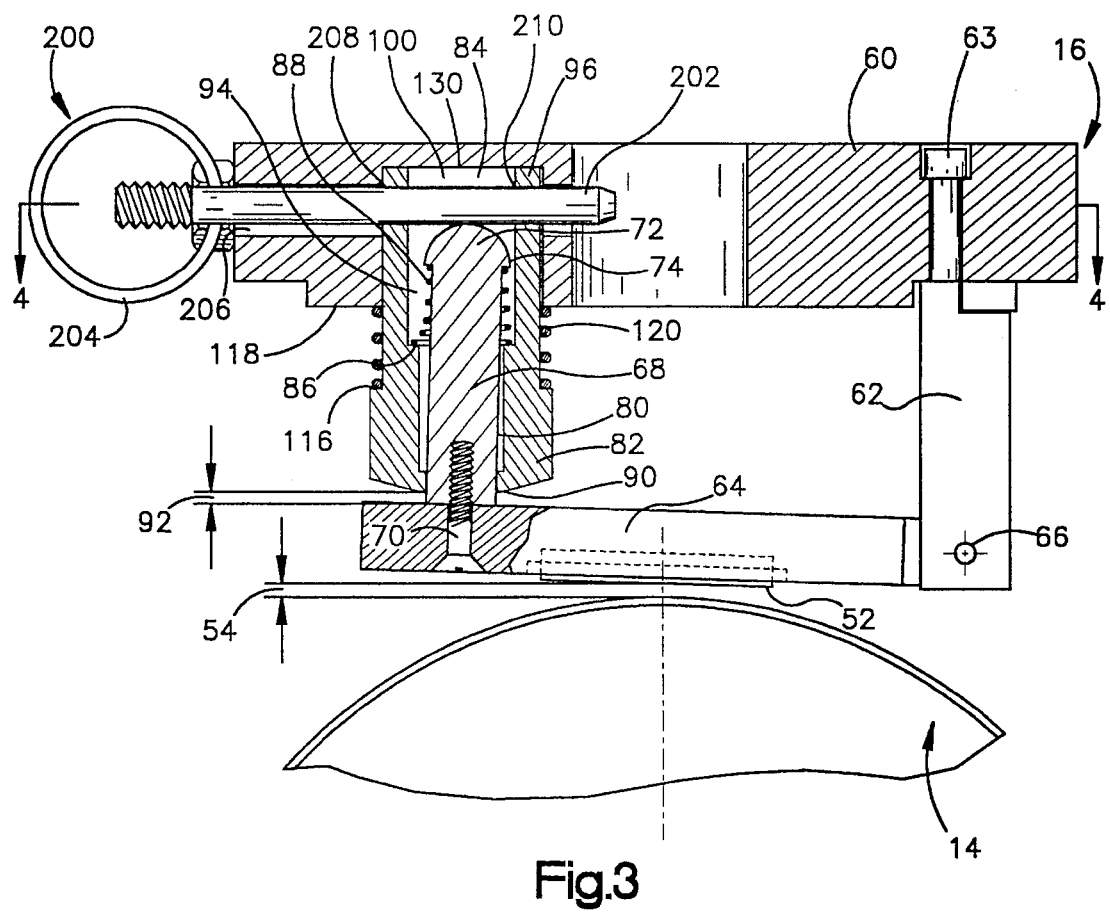
FIG. 3 is an elevational view, partly in section, illustrating the stator assembly in accordance with the present invention when located in a retracted position.
Figure 4:
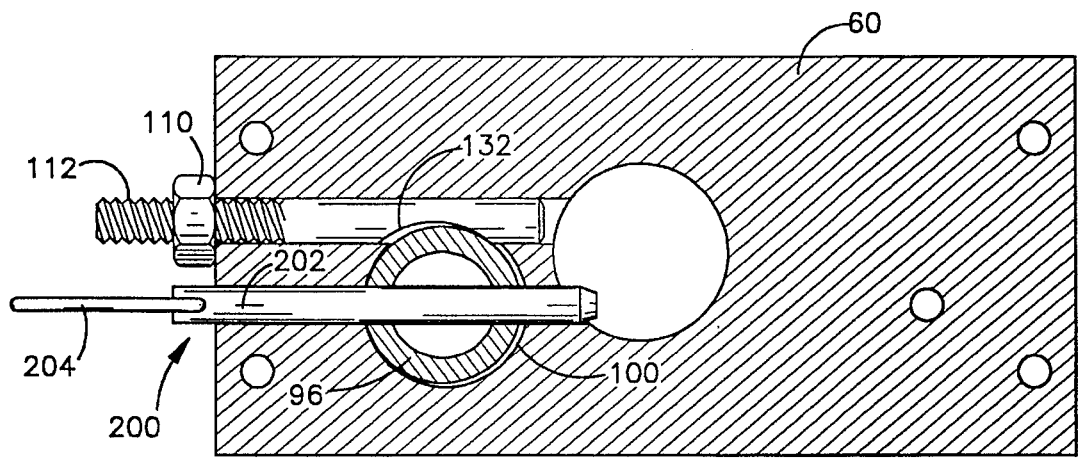
FIG. 4 is a sectional view taken along line 4—4 in FIG. 3 looking in the direction of the arrows.

Reference is now made to FIGS. 3 and 4 which illustrate the sensor assembly 16 with the sensor 52 being in its retracted position relative to the rotor 14 so that the sensor gap 54 is at its maximum length, on the order of 0.052 inches. The sensor assembly is removable from the stator housing 12 as with the use of suitable screws 18 which protrude through a portion of the assembly known as the top block 60 and, thence, into the stator housing 12. For purposes of simplification, the removable stator assembly is illustrated in FIGS. 3–8 as being removed from the stator housing, but proximate to the rotor 14. Extending downwardly from the top block 60 there is provided a side post 62 which is secured to the top block as with a suitable screw 63. A sensor block 64 is hinged at one end to the lower end of the side post 62 by means of a suitable pivot pin 66 extending through post 62 and one end of block 64. The sensor block 64 may pivot about the pivot post 66 between the retracted position as shown in FIG. 3 to the contact position of FIG. 5 and then to an intermediate position or gap established position as in FIG. 7 (all to be discussed in detail hereinafter).

The sensor support 64 carries the sensor 52 for pivotal movement therewith. The sensor 52 may take the form of a rectangular flat plastic body which encapsulates the electronic circuitry therein. The sensor 52 is secured to a recess or the like in the bottom surface of sensor support 64 as with a suitable epoxy or the like.

The sensor support 64 carries an upstanding plunger 68 at its end opposite from that of the hinge pivot post 66. The plunger 68 and top block 60 may be of suitable material, such as metal. The side post 62 and sensor support 64 may be constructed of suitable material, such as plastic or metal. The plunger 68 is mounted to the support 64 as with a bolt 70 which extends through a suitable aperture in support 64 and then is threaded into a threaded bore in the lower end of plunger 68. The plunger 68 may be circular in cross-section and extends upwardly from the support 64 and is topped with a domed cap 72 having an annular outwardly extending flange 74.

The plunger 68 is mounted for vertical reciprocal movement within a bore 80 extending vertically through a bushing 82. Bore 80 within bushing 82 has an enlarged bore 84 separated from the lower portion of the bushing by means of a radially extending shoulder 86. A coiled gaping spring 88 coaxially surrounds a portion of the length of plunger 68 between shoulder 86 of bushing 82 and the annular flange 74 on the plunger 68. This spring is biased so as to tend to push the plunger in an upward direction, as viewed in FIG. 3. The lower end of bushing 82 has an inwardly flanged annular surface extending to a chisel point 90 which, in the retracted position of FIG. 3, defines a gap 92 between chisel point 90 and the upper Surface of sensor support 64. This gap 92 varies in length depending upon the position of the support 64 relative to bushing 82 as will be described in greater detail hereinafter.

The upper portion of bushing 82, surrounding bore 84, serves as a sleeve 96. This sleeve, in the retracted position as shown in FIG. 3, extends up into a bore 100 formed in the lower surface of upper block 60. The internal diameter of bore 100 and the external diameter of sleeve 96 provide a somewhat loose relationship and which is exaggerated in FIGS. 4, 6 and 8. This is for purposes of illustration relative to the operation in conjunction with a lock nut 110 and a clamping pin 112 to be described hereinafter.

The lower portion of the bushing 82 has an outwardly extending annular shoulder 116. Between this shoulder 116 and the lower surface 118 of the top block 60 there is provided a coiled extension spring 120. This spring surrounds bushing 82 and tends to resiliently bias the bushing 82 in a downward direction relative to the top block 60. It is to be noted that the extension spring 120 is a weak spring relative to that of the gaping spring 88.

Figure 5:
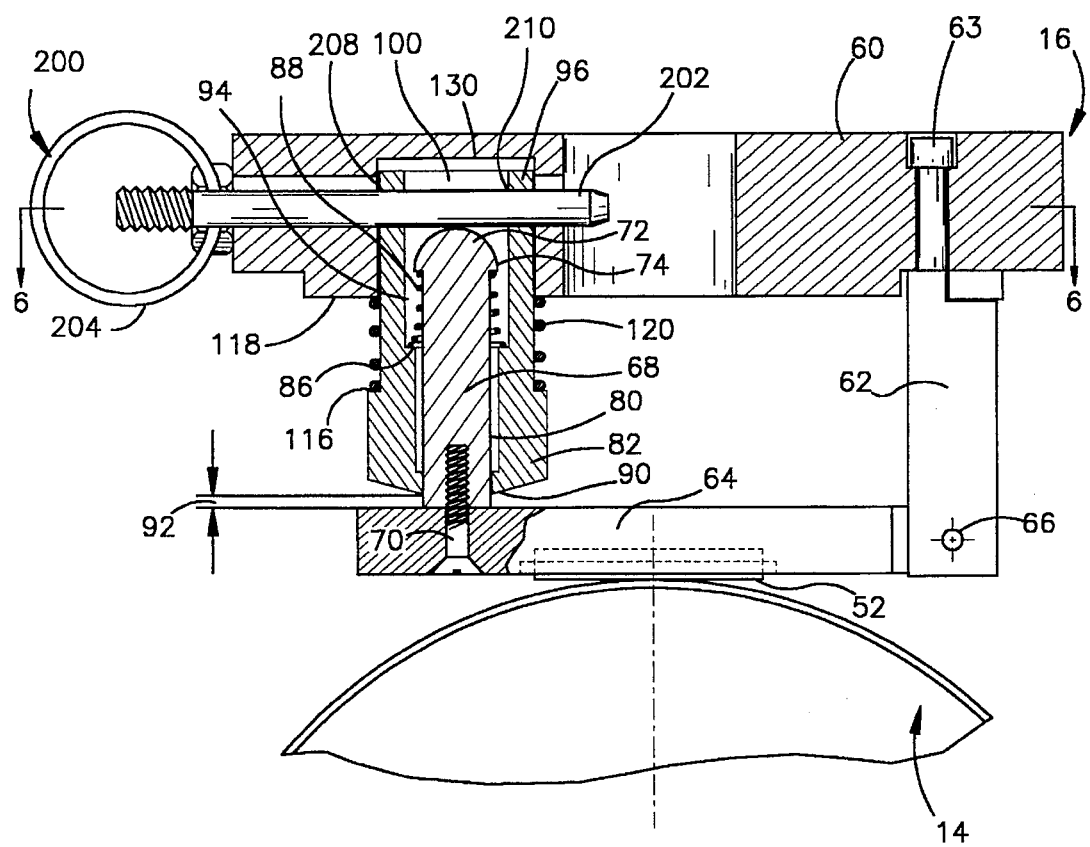
FIG. 5 is a view similar to that of FIG. 3 but showing the sensor in its contact position against the rotor.
Figure 6:
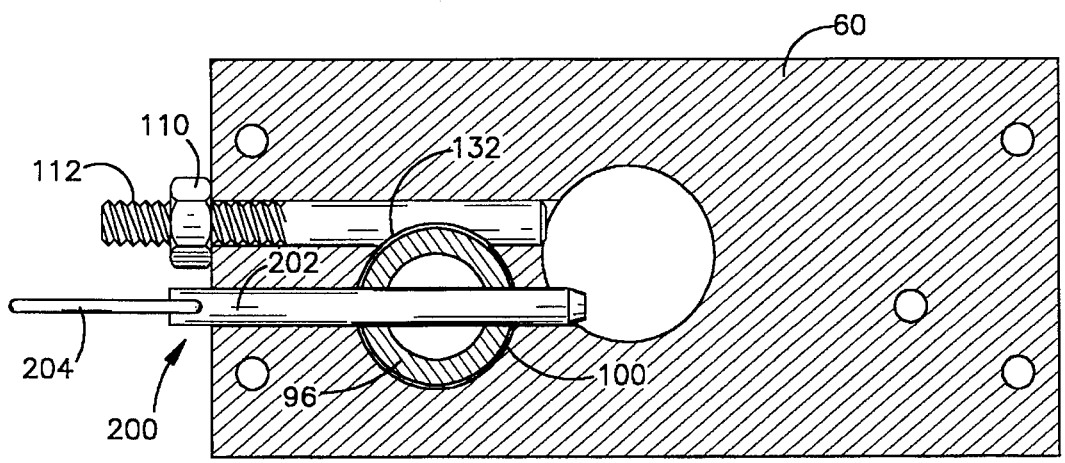
FIG. 6 is a view taken generally along line 6—6 looking in the direction of the arrows in FIG. 5.

In the retracted position, as shown in FIGS. 3 and 4, the bushing 82 is in place so that the upper edge of sleeve 96 bears against the lower surface 130 in the bore 100 in the top block 60. As shown in FIG. 4, the clamping pin 112 is provided with a recess 132 which, in the position as shown in FIG. 4, bears against the outer circumference of sleeve 96 pushing the sleeve toward the left so that it makes frictional engagement with the inner wall of recess 100. A lock nut 110 may be rotated so as to be unthreaded somewhat from the threaded end of the clamping pin 112, permitting the pin to move slightly to the right to loosen the engagement between sleeve 96 and the left side of the bore 100. By loosening the lock nut, the extension spring 120 resiliently forces bushing 82 in a downward direction. This causes the sensor support 64 to pivot in a counterclockwise direction about pivot pin 66, as viewed in FIGS. 3, 5 and 7. This movement will continue until the sensor 52 carried by the support 64 makes physical engagement with the rotor 14 and thereby reduces the gap 54 to 0.000 inches. This contact position is shown in FIGS. 5 and 6. It is to be further noted that extension spring 120 is chosen so that when the clamping pin 112 is loosened as described above, the spring will exert a controlled resilient force to push the sensor 52 in a downward direction so as to lightly contact the rotor without causing damage to either the magnetic pattern 50 carried by the rotor or to the sensor 52.

Figure 7:
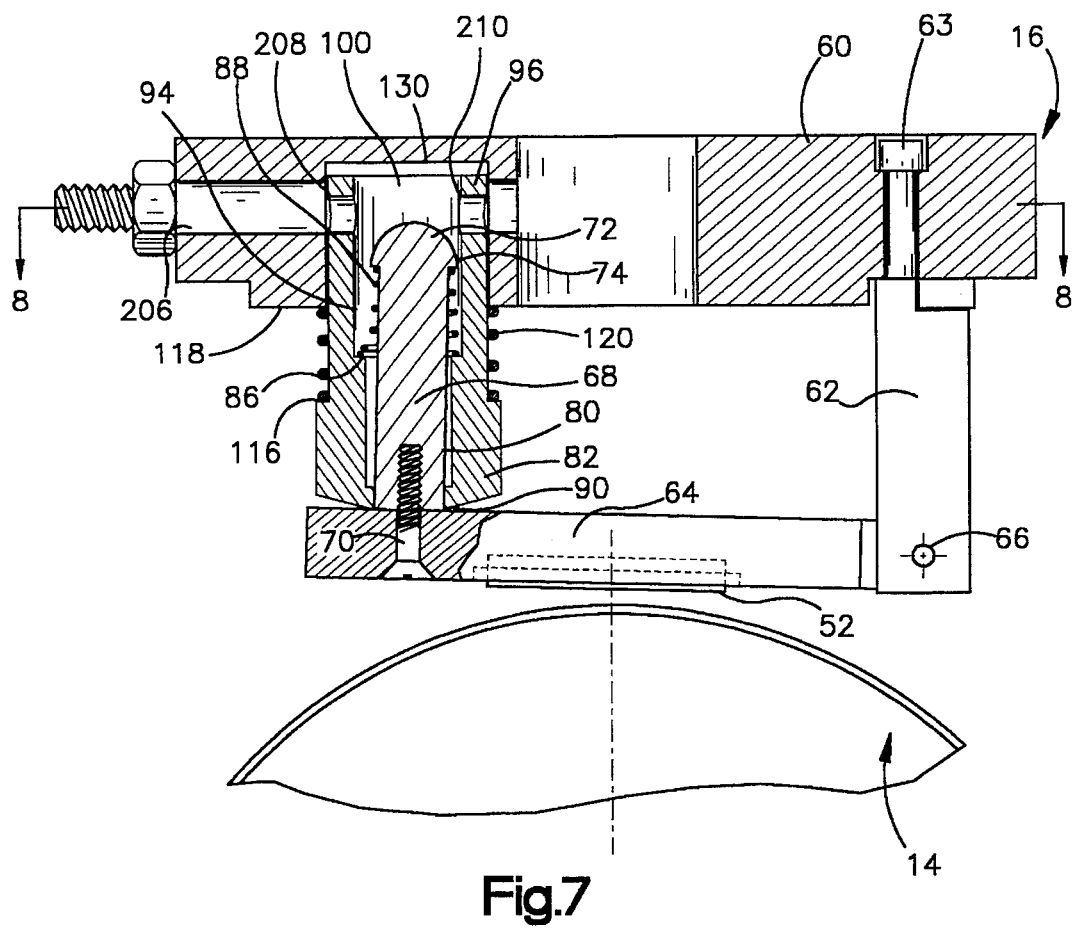
FIG. 7 is a view similar to that of FIGS. 3 and 5 but illustrating the final position of the sensor relative to the rotor with the preset gap being established.
Figure 8:
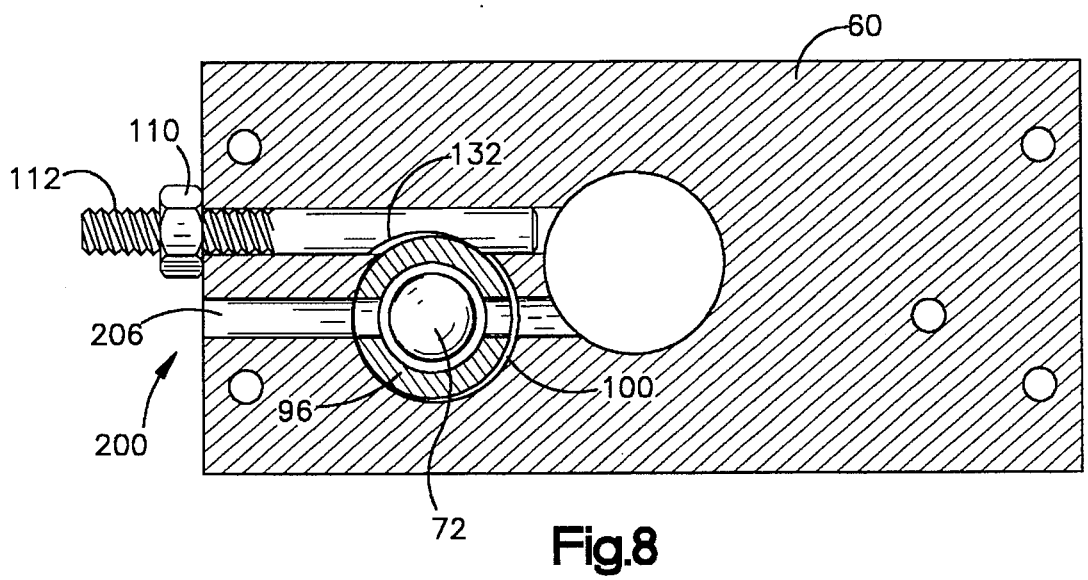
FIG. 8 is a view taken generally along line 8—8 looking in a direction of the arrows in FIG. 7.

During the foregoing movement from the retracted position, as shown in FIG. 3, to the contact position, as shown in FIG. 5, relative movement between plunger 68 and bushing 82 has been prevented by means of a quick release pin 200. Pin 200 includes an elongated rod 202 of circular cross-section together with a suitable ring 204 which may be grasped by an operator's finger when removing the pin from the structure or when inserting the pin. With the pin in place as is shown in FIGS. 3 and 5, the plunger 68 cannot be moved in an upward direction by resilient force exerted by the gaping spring 88. When the rod 202 is in place as shown in FIGS. 1 and 2, it extends through an oversize vertical slot 206 in the top block 60 and through aligned circular apertures 208 and 210 in sleeve 96 of bushing 82. The apertures 208 and 210 are just slightly greater in diameter than that of the rod 202 to permit the rod to be inserted and retracted from the apertures with a sliding fit. The vertical slot 206 is oversized and permits vertical movement of pin 200 when the lock nut 110 is loosened on the clamping pin 112 permitting the bushing 82 and pin 200 to move from the retracted position to the contact position. The lock nut 110 is tightened so that clamping pin 202 again bears against sleeve 96 so that the sleeve engages the left side wall of bore 100, as is seen in FIG. 8. However, when the pin 200 is removed, by pulling ring 204 as is shown in FIG. 7, the plunger 68 is resiliently driven in an upward direction relative to the bushing 82 by a gaping spring 88 until the upper surface of the sensor support 64 strikes the chisel point 90 eliminating gap 92. At this point, the sensor gap 54 is now at the desired dimension, such as 0.014 inches. An elongated storage hole 250 is provided in the top block 60 for storage of the quick release pin 200 when the pin is removed from slot 206.

In operation the rotary pulse generator includes a rotor 14 mounted to the accessory end of the motor shaft 22 and held in place as with a suitable bolt 40. The stator housing 12 is secured to the motor by suitable fastening means, such as bolts 32. The sensor assembly 60 is secured to the stator housing 12 as with suitable screws 18. The stator housing and the sensor assembly are initially mounted on the motor with the sensor block 64 in its retracted position, as is shown in FIGS. 3 and 4. In this position, a quick release pin 200 is in place and the clamping pin 112 is locked against bushing 82 preventing movement of the bushing relative to the top block 60. Thereafter, the lock nut 110 is loosened, permitting the extension spring 120 to resiliently drive the bushing in a downward direction. This causes support 64 to move sensor 52 in a counterclockwise direction about pivot pin 66 and engage rotor 14, as is shown in the contact position in FIGS. 4 and 5. The lock nut 110 is then re-tightened. The quick release pin 200 is then removed whereupon the gaping spring 88 resiliently drives plunger 68 in an upward direction. This causes the sensor support 64 to pivot in a clockwise direction about the pivot post 66 until the upper surface of support 64 engages the lowermost point of bushing 82 at the chisel point 90. This presets sensor gap 54 to the desired length, such as 0.014 inch. The rotary pulse generator is now ready for operation with no damage to the sensor incurred during installation and an optimum sensor gap has been established.

Alternative Embodiment

Figure 9:
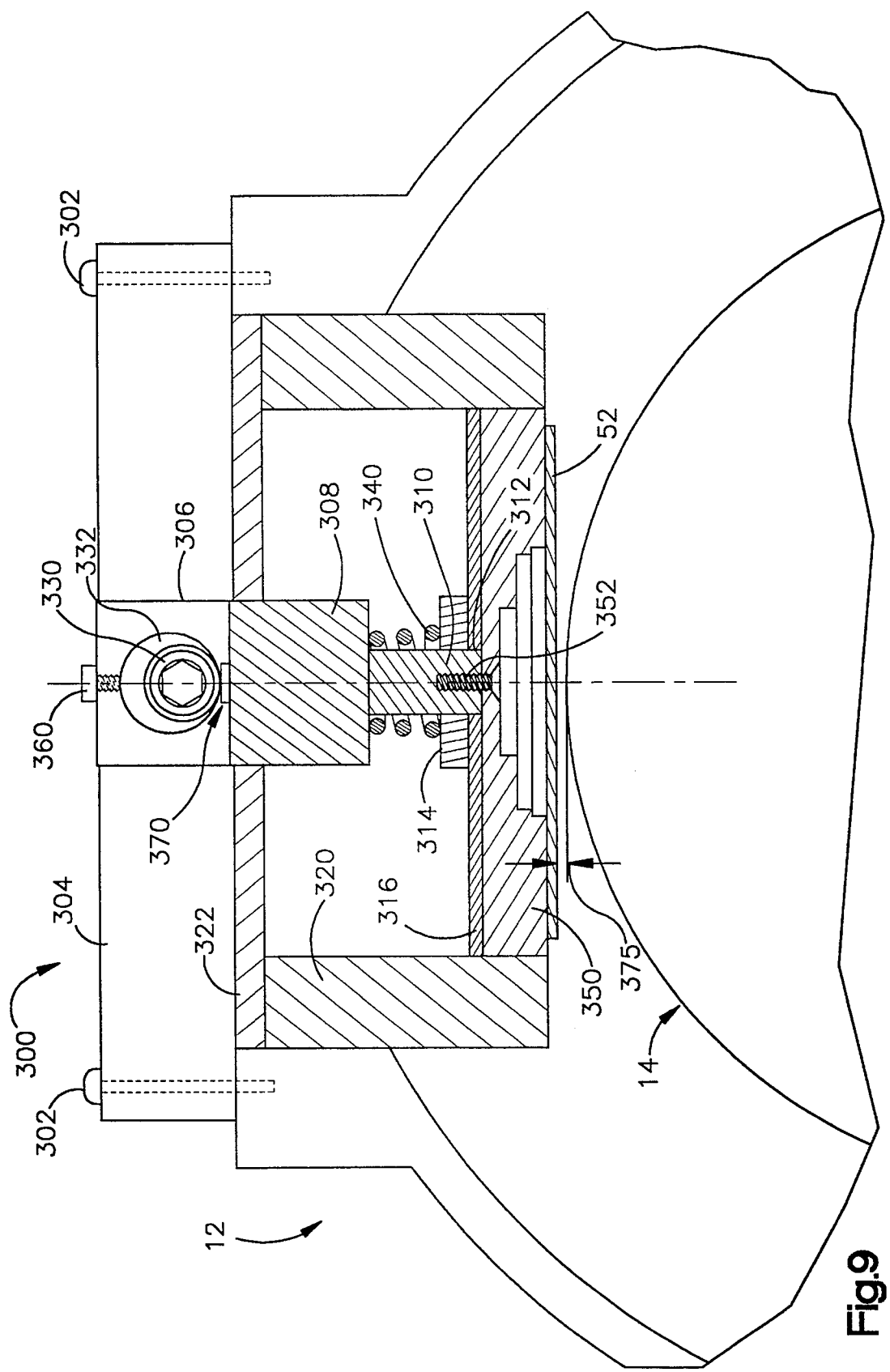
FIG. 9 is a elevational view partly in section similar to that of FIGS. 3, 5 and 7 but illustrating another embodiment of the invention.

Reference is now made to FIG. 9 which shows an alternative embodiment to that described with reference to FIGS. 1–8. This embodiment is quite similar to that shown hereinbefore and only the differences will be described herein in detail.

In this embodiment, a sensor assembly 300 is removably secured to the stator housing 12, as with suitable screws 302. The sensor assembly includes a top block 304 which rests on top of the stator housing and which accommodates the screws 302. The top block 304 is provided with a central bore 306 which receives a center post 308 for reciprocal vertical movement. The center post 308 includes a lower post 310 which extends through an aperture 312 in a guide 314. Guide 314 is mounted on a plate 316 which, in turn, is secured to the top block 304 by way of suitable side posts 320 and a horizontal plate 322. A rotatable shaft 330 extends horizontally through the top block and carries a cam 332 which bears against an upper surface of the center post 308. The post 308 is biased in an upward direction by a coiled spring 340 so that as the cam 306 is turned, the center post 308 is driven in an upward and downward direction relative to the rotor 14. The rotor 14 is constructed in the same manner as that described hereinbefore with reference to the embodiment of FIGS. 1–8.

A sensor block 350 is carried by the post 310 and is secured thereto by means of a suitable bolt 352 which extends through the sensor block 350 and into the post 310. The sensor block 350 carries on its lower surface a sensor 52, constructed in the same manner as sensor 52 in the embodiment of FIGS. 1–8. A set screw 360 extends through the top block 304 to engage the cam 332 to prevent rotation thereof until the set screw is loosened. A shim 370 is located between the upper surface of the center post 308 and the cam 306. On installation, the set screw 360 is loosened which permits the cam shaft 330 to rotate and bear against shim 370 and, thence, center post 308. The cam shaft is rotated until the sensor block is lowered and the sensor makes contact with the rotor 14. At that point, the set screw 360 is re-tightened to secure the cam shaft in place. The shim 370, which is of a predetermined thickness, is externally accessible. The shim 370 is then removed as with a pair of pliers or the like. The sensor block is thus raised from the rotor by resilient force exerted by spring 340. This sets the sensor gap 375 by a preset amount equal to the thickness of the shim 370.

It will be noted that the shaft 330 and cam 332 in the embodiment of FIG. 9 serve to drive the sensor block from a retracted position to a position in which the sensor 52 contacts the rotor 14. In the embodiment of FIGS. 1–8, the same function is performed by loosening the lock nut 110, which released the bushing 82 so as to be driven in a downward direction by extension spring 120. The sensor 52 moves in a downward direction to make contact with the rotor 14, as indicated in FIG. 5. Also in the embodiment of FIG. 9, the removal of shim 370 is similar to the removal of the quick release pin 200 in the embodiment in FIGS. 1–8. Both permit a spring to drive the sensor in an upward direction away from the rotor by a predetermined amount.

Although the invention has been described in conjunction with a preferred embodiment, it is to be appreciated that various modifications may be made without departing from the spirit and scope of the invention as defined by the appended claims.

Having described the invention, the following is claimed:

1. A rotary pulse generator for attachment to a machine housing having a rotary shaft extending therefrom, said generator comprising:

a rotor and means for securing said rotor to said shaft for rotation therewith, said rotor having a circumferential surface including an annular periodic pulse generating pattern;

a stator housing and means for securing said stator housing to said machine housing so as to encompass said rotor;

a sensor assembly including a sensor carried by said stator housing with said sensor being spaced radially from said rotor circumferential surface by a sensor gap, said sensor serving for providing an output pulsating signal exhibiting a frequency related to the angular velocity of said rotor;

said assembly including a support block, a sensor support mounted to said support block for movement relative thereto between a retracted position located remote from said rotor and a contact position wherein said sensor block contacts said rotor;

first means for driving said sensor block in a first direction from said retracted position toward and engage said rotor in said contact position; and second means for driving said sensor block in a second direction opposite from said first direction from said contact position toward said retracted position by a predetermined amount so that said sensor gap has a spacing dependent upon said predetermined amount.

2. A pulse generator as set forth in claim 1 wherein said first means includes an extension spring for resiliently driving said sensor block in said first direction from said retracted position to said contact position.

3. A pulse generator as set forth in claim 1 wherein said first means includes camming means for driving said sensor block in said first direction from said retracted position to said contact position.

4. A pulse generator as set forth in claim 3 including a removable shim interposed between said camming means and said sensor block, said shim being of a thickness corresponding with said predetermined amount.

5. A pulse generator as set forth in claim 2 including means for locking said sensor block in place to prevent movement relative to said support block.

6. A pulse generator as set forth in claim 5 wherein said locking means includes manually operable means for supplying frictional force to prevent said relative movement.

7. A pulse generator as set forth in claim 6 including a plunger carried by said sensor support for movement therewith relative to said support block.

8. A pulse generator as set forth in claim 7 including a bushing carried by said support block for slidable movement relative thereto.

9. A pulse generator as set forth in claim 8 including releasable means for releasably securing said bushing in place relative to said support block.

10. A pulse generator as set forth in claim 9 wherein said releasable means includes an elongated lock pin slidably carried by said support block for slidable movement between a bushing locked position and a bushing released position.

11. A pulse generator as set forth in claim 10 including locking means for releasably locking said pin.

12. A pulse generator as set forth in claim 11 wherein said bushing is provided with an elongated bore therein for slidably receiving said plunger.

13. A pulse generator as set forth in claim 12 wherein said extension spring is located between said bushing and said support block for resiliently driving said bushing away from said support block.

14. A pulse generator as set forth in claim 13 wherein said second means includes a gaping spring located intermediate said plunger and said bushing for resiliently biasing said plunger in a direction away from said contact, position.

15. A pulse generator as set forth in claim 14 including means for mounting said sensor block for pivotal movement relative to said support block between said contact position and said retracted position.

* * * * *